United States Patent
Khaled et al.

(10) Patent No.: US 10,975,748 B2
(45) Date of Patent: Apr. 13, 2021

(54) PRESSURE AND FLOW CONTROL FOR FIXED DISPLACEMENT PUMP IN REDUCTANT DOSING SYSTEM

(71) Applicant: CUMMINS EMISSION SOLUTIONS INC., Columbus, IN (US)

(72) Inventors: Nassim Khaled, Khobar (SA); Masoud Ziabakhsh Deilami, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/500,058

(22) PCT Filed: Apr. 5, 2018

(86) PCT No.: PCT/US2018/026285
§ 371 (c)(1),
(2) Date: Oct. 1, 2019

(87) PCT Pub. No.: WO2018/187589
PCT Pub. Date: Oct. 11, 2018

(65) Prior Publication Data
US 2020/0056525 A1    Feb. 20, 2020

Related U.S. Application Data

(60) Provisional application No. 62/482,466, filed on Apr. 6, 2017.

(51) Int. Cl.
*F01N 3/20* (2006.01)
*F01N 9/00* (2006.01)

(52) U.S. Cl.
CPC ............. *F01N 3/206* (2013.01); *F01N 3/208* (2013.01); *F01N 9/00* (2013.01);
(Continued)

(58) Field of Classification Search
CPC ........ F01N 3/206; F01N 3/208; F01N 3/2066; F01N 9/00; F01N 2610/144;
(Continued)

(56) References Cited

U.S. PATENT DOCUMENTS 7,316,545 B2    1/2008    Lenke
2009/0113877 A1    5/2009    Van Nieuwstadt
(Continued)

OTHER PUBLICATIONS

International Search Report and Written Opinion issued for PCT/US2018/026285, dated Jun. 28, 208, 12 pages.

*Primary Examiner* — Audrey K Braley
*Assistant Examiner* — Dapinder Singh
(74) *Attorney, Agent, or Firm* — Foley & Lardner LLP

(57) ABSTRACT

A reductant dosing system includes: a doser; a fixed displacement pump in fluid communication with the doser; a reductant source in fluid communication with the fixed displacement pump; and a controller communicatively coupled to the fixed displacement pump to control operation of the fixed displacement pump, wherein the controller is programmed to operate the fixed displacement pump using a pressure control system responsive to data indicative of the doser not dosing reductant and the controller is programmed to operate the fixed displacement pump using a flow control system responsive to data indicative of the doser dosing reductant.

16 Claims, 5 Drawing Sheets

(52) U.S. Cl.
CPC .......... *F01N 2610/144* (2013.01); *F01N 2900/1404* (2013.01); *F01N 2900/1411* (2013.01); *F01N 2900/1808* (2013.01); *F01N 2900/1811* (2013.01)

(58) Field of Classification Search
CPC ..... F01N 2900/1404; F01N 2900/1411; F01N 2900/1808; F01N 2900/1811; Y02T 10/12; Y02T 10/40
USPC .................................. 60/274, 286, 295, 301
See application file for complete search history.

(56) References Cited

U.S. PATENT DOCUMENTS

| | | |
|---|---|---|
| 2013/0031890 A1 | 2/2013 | Shovels et al. |
| 2014/0260216 A1* | 9/2014 | Everard .................. F01N 3/208 60/301 |
| 2015/0260069 A1* | 9/2015 | Dea .......................... F01N 3/208 60/274 |

* cited by examiner

PRESSURE AND FLOW CONTROL FOR FIXED DISPLACEMENT PUMP IN REDUCTANT DOSING SYSTEM

CROSS REFERENCE TO RELATED APPLICATIONS

This application is a national stage of PCT Application No. PCT/US2018/026285, filed Apr. 5, 2018, which claims priority to and the benefit of U.S. Provisional Patent Application No. 62/482,466 filed Apr. 6, 2017. The contents of these applications are incorporated herein by reference in their entireties and for all purposes.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through a doser that vaporizes or sprays the reductant into an exhaust pipe of the exhaust system upstream of the catalyst chamber. The SCR system may include one or more sensors to monitor conditions within the exhaust system.

SUMMARY

Implementations described herein relate to a reductant dosing system for dosing reductant into an exhaust system for reducing $NO_x$. The reductant dosing system can include a fixed displacement pump for pumping reductant from a reductant source to a doser for dosing reductant into the exhaust system. A controller of the system may operate the system as a pressure control system when the doser is not dosing reductant and as a flow control system when the doser is dosing reductant. The flow control system utilizes the fixed linear relationship of the flow rate to the pump frequency or displacement to accurately control the flow rate output of the pump with reduced processing by the controller. The pressure control system operates the pump using outlet pressure measurements for feedback control when the doser is not dosing reductant. Thus, the controller may switch between the pressure control system and the flow control system based on whether the system is dosing reductant or not.

One implementation relates to a reductant dosing system that includes a doser, a fixed displacement pump in fluid communication with the doser, a reductant source in fluid communication with the fixed displacement pump, and a controller communicatively coupled to the fixed displacement pump to control operation of the fixed displacement pump. The controller is programmed to operate the fixed displacement pump using a pressure control system responsive to data indicative of the doser not dosing reductant and programmed to operate the fixed displacement pump using a flow control system responsive to data indicative of the doser is dosing reductant.

Another implementation relates to a process that includes accessing one or more input values for one or more of a reductant temperature, a desired dosing rate, a measured pump outlet pressure, an exhaust flow rate, or an exhaust temperature. The process includes determining a pump pressure target for a fixed displacement pump based on the accessed input values. The process further includes comparing the pump pressure target to the measured pump outlet pressure and outputting a pump frequency command to the fixed displacement pump to control pumping of reductant from a reductant tank through an outlet of the fixed displacement pump to a doser via an outlet line and back to the reductant tank via a return line.

A further implementation relates to a process that includes accessing one or more input values for one or more of a reductant temperature, a desired dosing rate, a measured pump outlet pressure, an exhaust flow rate, or an exhaust temperature. The process includes determining a pump frequency command based on the accessed input values and outputting the pump frequency command to a fixed displacement pump to control pumping of reductant from a reductant tank through an outlet of the fixed displacement pump to a doser via an outlet line for dosing.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
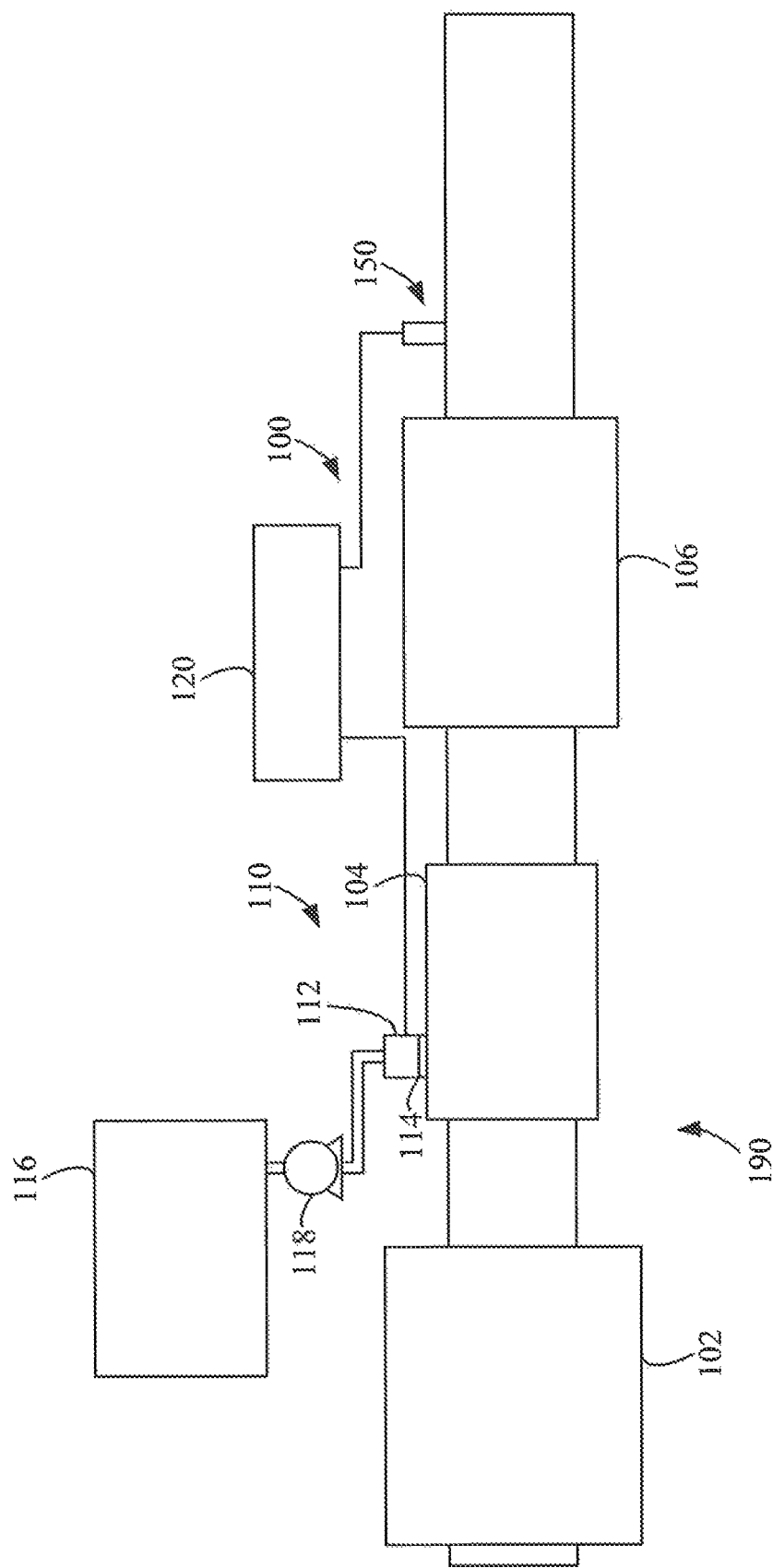
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for, controlling a fixed displacement pump for a reductant dosing system. More particularly, the present disclosure describes the use of a flow or frequency control system and a pressure control system for controlling the fixed displacement pump. The flow or frequency control system is implemented by a controller to control the fixed displacement pump during dosing operations, and the pressure control system is implemented by the controller to control the fixed displacement pump when not dosing. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some implementations of an aftertreatment system, a fixed displacement pump may be implemented to pump reductant to a doser. A fixed displacement pump can deliver a substantially fixed flow rate of reductant based on a pump displacement or frequency. However, as the flow rate increases, resistive pressure in the fluid lines may decrease the flow rate at corresponding pump displacements or frequencies. However, even with the decreased flow rates, the flow rate to pump displacement or frequency maintains a substantially linear relationship. Accordingly, using a pump frequency and pump output pressure, which is indicative of the resistive pressure, a controller can accurately dose reductant with reduced calculations and input variables. For instance, the flow rate from a fixed displacement pump can be calculated as a function of pump frequency, pressure differential, and temperature of the reductant. In some implementations, the voltage of a battery providing power to the fixed displacement pump can be used to further refine the flow rate function. The foregoing can be considered a flow or frequency control system.

While the fixed displacement pump can be controlled based on the pump displacement or frequency when dosing reductant, it may also be useful to circulate reductant through the dosing system when not dosing reductant, such as from the reductant tank to the pump through the doser and finally to the reductant tank again through a return line. Such circulation of reductant can thermally cool the pump and/or doser when operating in hot ambient temperatures and/or reduce the likelihood of freezing within the system when operating in cold ambient temperatures. In such instances, a pressure control system that monitors pump pressure can be used for a feedback control system to control the pump the circulate reductant through the system.

In some implementations described herein, a system can switch between the flow or frequency control system during dosing and the pressure control system when not dosing. Such a switched pressure/flow control system can be implemented by a controller to output a pump frequency command to the fixed displacement pump for accurate dosing when the flow or frequency control system is operative and output a different pump frequency command to the fixed displacement pump for circulating reductant within the system when the pressure control system is operative.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a reactor pipe or decomposition chamber 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

In certain implementations, the controller 120 is structured to perform certain operations, such as those described herein in relation to FIGS. 4-8. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to functionally execute the operations of the controller 120. In certain implementations, the controller 120 may include a frequency control circuit, a pressure control circuit, and a system switch control circuit for performing the operations described in reference to FIGS. 4-8. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components. More specific descriptions of certain embodiments of controller operations are included in the section referencing FIGS. 4-8.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the reactor pipe or decomposition chamber 104. For instance, the DPF 102 and the SCR catalyst 106 may be combined into a single unit, such as a DPF with SCR-coating (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150 with each sensor 150 located at one of the foregoing positions of the exhaust system 190.

II. Example of Switched Pressure/Flow Control System

Figure 2:
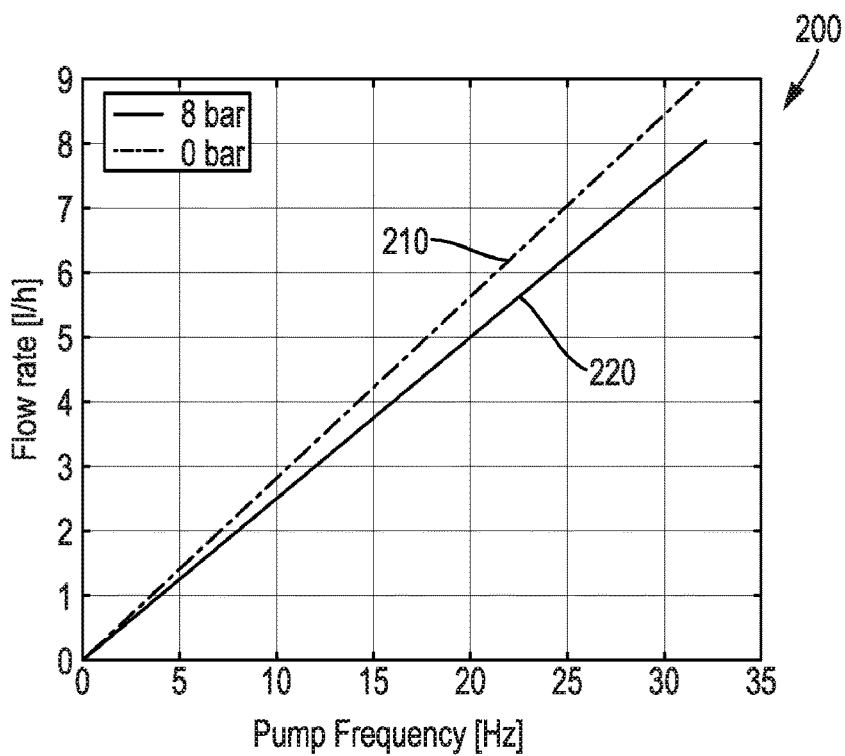
FIG. 2 is a graphical diagram depicting a flow rate of reductant from a fixed displacement pump relative to pump frequency at 0 bar pressure and 8 bar pressure to demonstrate the linear relationship.

FIG. 2 depicts a graphical diagram 200 depicting a flow rate of reductant from a fixed displacement pump relative to pump frequency at 0 bar pressure 210 and 8 bar pressure 220 to demonstrate the linear relationship. As shown by the alternating dotted and dashed line 210 for a zero bar pressure, the flow rate of fluid, such as reductant, from a fixed displacement pump has a substantially linear slope relative to pump frequency, which corresponds to pump displacement. As resistive or back pressure is increased for the outlet of the fixed displacement pump, as shown by the solid line 220 for an eight bar pressure, the flow rate decreases slightly at the same pump frequency when compared to the zero bar pressure line 210, but maintains a substantially linear slope relative to pump frequency. Accordingly, a lookup table or other data set may be generated for a fixed displacement pump for different resistive pressure values such that a desired flow rate may be looked up for a corresponding resistive pressure value and a corresponding pump frequency can be retrieved. In some implementations, a linear equation may also be derived from experimental data for the different resistive pressures and used to calculate a corresponding pump frequency when a value for a desired flow rate for a given resistive pressure. Thus, using a desired flow rate output from the fixed displacement pump, a pump frequency can be calculated or determined from a lookup table. The pump frequency can then be used to determine an input voltage to the fixed displacement pump based on the characteristics of the pump (i.e., the fixed displacement pump may have a known operating voltage range for a known operating pump frequency range as provided by the manufacturer of the pump and/or calculated based on testing data points). A controller can use a desired pump output flow rate to determine the input voltage needed to achieve the pump output flow rate using the foregoing.

Figure 3:
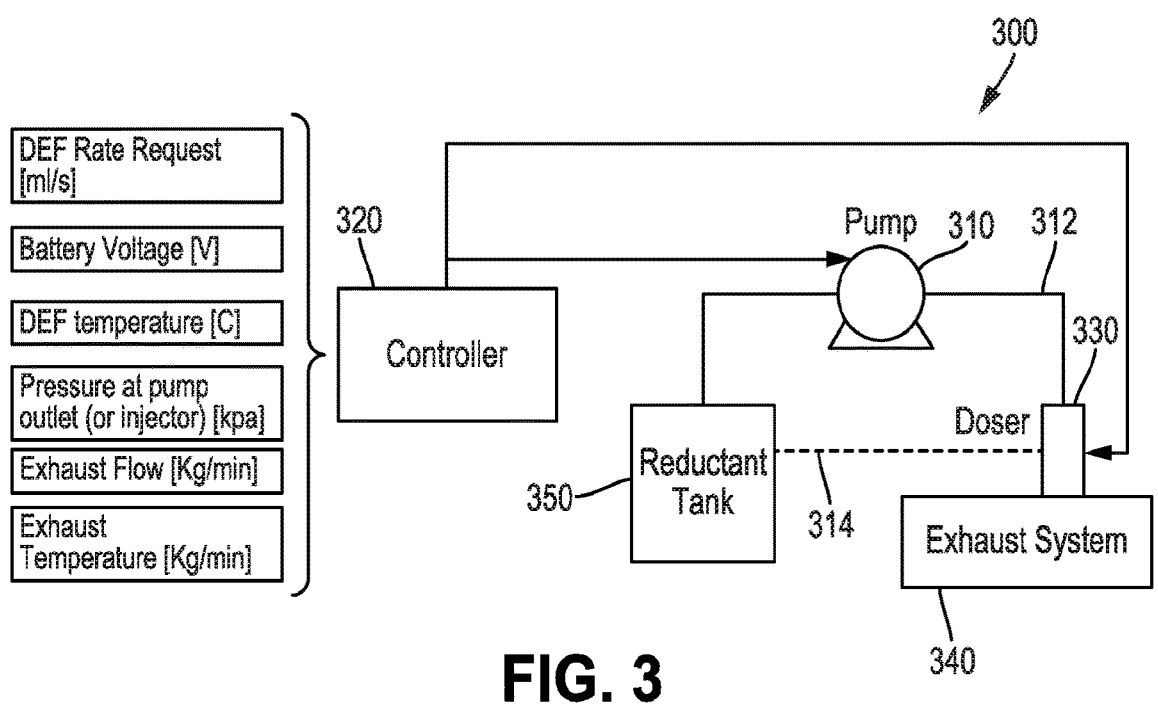
FIG. 3 is a block diagram of components of a switched pressure/flow control system and showing the input parameters to a controller for the system.

FIG. 3 depicts an overview of an implementation of a switched pressure/flow control system 300 using a fixed displacement pump 310. The system 300 includes a controller 320, a fixed displacement pump 310, a doser 330 to dose reductant into an exhaust system 340, and a reductant tank 350. In some implementations a pump outlet pressure sensor can be included at the outlet of the pump 310, in a line 312 from the pump to the doser 330, in the doser 330, and/or in the return line 314 from the doser 330 to the reductant tank 350. The controller 320 is communicatively and/or electrically coupled to the fixed displacement pump 310 and a doser 330. In some implementations the controller 320 may control an input voltage to the pump 310 and/or doser 330 to control operation of the pump 310 and/or doser 330. In other implementations, the controller 320 may include a data line to the pump 310 and/or doser 330 such that a parameter value may be passed to the pump 310 and/or doser 330 for internal control circuitry of the pump 310 and/or doser 330 to control operation thereof. The controller 320 may also be communicatively and/or electrically coupled to the pressure sensor to access and/or receive data values indicative of a measured pressure by the pressure sensor (e.g., voltages output by and/or accessed from the pressure sensor and/or parameter values output by and/or accessed from the pressure sensor).

The reductant tank 350 is in fluid communication with the pump 310 at a pump inlet and the doser 330 is in fluid communication with the pump 310 at a pump outlet. Thus, the controller 320 can control operation of the fixed displacement pump 310 to pump reductant from the reductant tank 350 via the pump inlet and deliver reductant to the doser 330 from the pump outlet at a desired flow rate using a pump frequency based on the linear relationship between flow rate and pump frequency as described in reference to FIG. 2. In some implementations, the doser 330 may include an outlet for a return line 314 to be in fluid communication with the reductant tank 350. Thus, reductant can also be pumped from the reductant tank 350 and circulated through the doser 330 and back to the reductant tank 350 via the return line 314. In some implementations, the system 300 may circulate reductant from the reductant tank 350, through the pump 310, doser 330, and return line 314 only when the doser 330 is not dosing reductant into the exhaust system 340. In other implementations, the system 300 may also circulate reductant from the reductant tank 350, through the pump 310, doser 330, and return line 314 when the doser 330 is dosing reductant into the exhaust system 340.

Based on a desired dosing rate (e.g., a flow rate of reductant through a nozzle of the doser 330 into the exhaust system 340 to reduce exhaust emissions), the controller 320 can modify an input voltage and/or pump frequency command to the pump 310 to achieve a desired flow rate out of the fixed displacement pump 310 using the data described in reference to FIG. 2. In implementations where the system 300 includes the return line 314 and circulates reductant while dosing reductant from the doser 330, the flow rate from the outlet of the pump 310 can be increased or decreased to maintain a system flow rate as the dosing rate changes. That is, for a desired dosing rate, a desired reductant recirculation flow rate, and a measured pump output pressure (i.e., the resistive pressure), a desired pump outlet flow rate can be calculated. Using the desired pump outlet flow rate, the controller 320 can output a pump frequency parameter value and/or control an input voltage to the fixed displacement pump 310 to achieve the desired pump outlet flow rate using the lookup table and/or linear equation(s) for the measured pump outlet pressure.

In some implementations, the controller 320 may also use inputs of desired reductant rate, a battery voltage, a reductant temperature, an exhaust flow rate, and/or an exhaust temperature in determining the pump outlet flow rate. That is, the controller 320 may access and/or receive data indicative of an exhaust flow rate, an exhaust temperature, a reductant temperature, a desired reductant rate, and/or a battery voltage. Based on these input values, the controller 320 can determine the desired pump outlet flow rate to achieve the desired reductant dosing rate. For instance, the exhaust flow rate and/or exhaust temperature can be used to determine the desired dosing rate to reduce $NO_x$ in the exhaust gas flowing through the exhaust system 340. In some implementations the exhaust flow rate and/or exhaust temperature may be measured values from a flow rate sensor and/or temperature sensor or the exhaust flow rate and/or exhaust temperature may be estimated values from a virtual sensor based on engine operating conditions. The reductant temperature can be used to determine a density of reductant and/or be used for controlling a recirculation flow rate of reductant. The reductant temperature may be a measured value from a temperature sensor in the reductant tank 350, in a line from the reductant tank 340 to the pump 310, in a line 312 from the pump 310 to the doser 330, in the doser 330, and/or in the return line 314 from the doser 330 to the reductant tank 350. The battery voltage may be measured by the controller 320 and used to determine range of voltages that can be applied to the pump 310 and/or doser 330 for controlling operation thereof.

Referring to FIGS. 4-8, the controller 320 of the switched pressure/flow control system 300 of FIG. 3 can implement the processes described herein for controlling operation of the fixed displacement pump 310 to operate the switched pressure/flow control system 300 as a pressure control system 410 when the system is not dosing reductant or as a flow control system 510 to control dosing of reductant from the doser when dosing is occurring.

Figure 4:
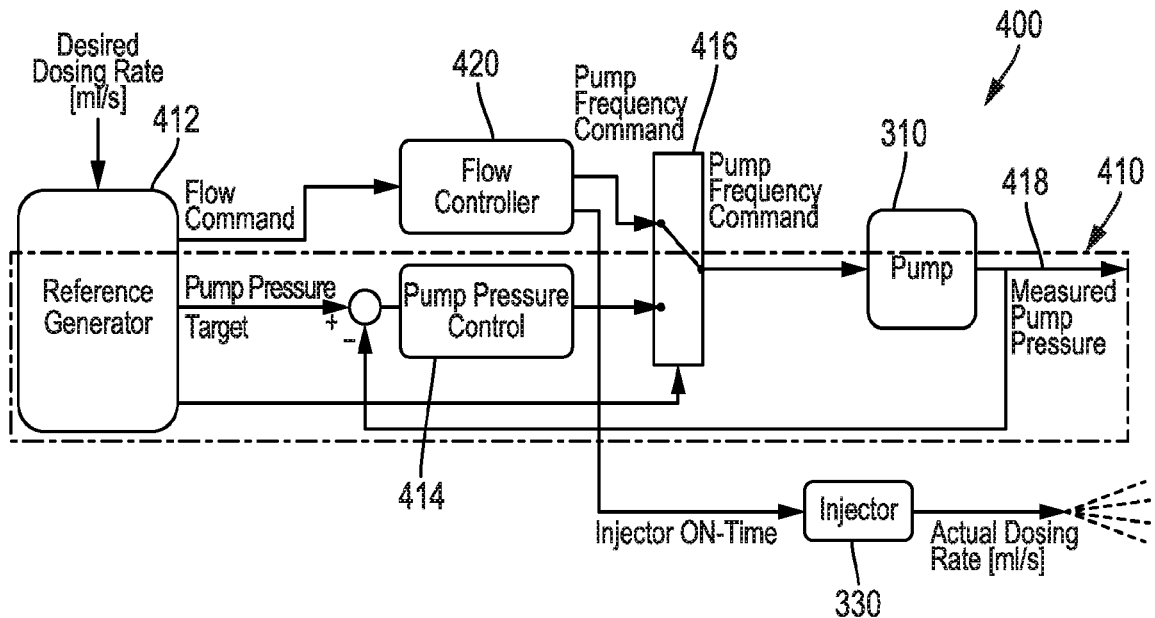
FIG. 4 is a process diagram depicting the switched pressure/flow control system implemented by the controller of FIG. 3 and showing in detail the components of the pressure control system.

FIG. 4 depicts a control process diagram 400 with the components of the pressure control system 410 outlined in the dot and dashed lines. In the implementation shown, the pressure control system 410 includes a reference generator 412, a pump pressure feedback control 414, a switch control 416, the fixed displacement pump 310, and a measured pump pressure 418. The pressure control system 410 can be implemented by the controller 320 when the switched pressure/flow control system 300 is not dosing reductant using the doser 330. As shown in the control diagram 400, a pump pressure target is output from the reference generator 412 to the pump pressure feedback control 414.

The reference generator 412 can determine a desired pump pressure target based on a reductant temperature and a measured pump outlet pressure 418 that are received and/or accessed by the controller 320. For instance, a lookup table may include experimentally acquired and/or calculated data for pump outlet pressures 418 for corresponding reductant temperatures to maintain reductant flow through the system 300 to reduce freezing and/or overheating of components due to ambient temperature conditions. In other implementations, the reference generator 412 may include derived equations for calculating desired pump outlet pressures 418 based on reductant temperatures.

The pump pressure target is output to the pump pressure feedback control 414 that uses a measured pump outlet pressure value 418, such as one accessed and/or received from a pressure sensor at the pump outlet, in the line from the pump 310 to the doser 330, in the doser 330, and/or in the return line 314, for feedback control of a pump frequency command that is to be output to the fixed displacement pump 310. In some implementations, the feedback control 414 may be a PID (proportional-integral-derivative) feedback control. The feedback control 414 compares the pump pressure target to the measured pump outlet pressure 418 and outputs a pump frequency command based on the feedback control provided by the measured pump outlet pressure 418. The pump frequency command is output to the fixed displacement pump 310 to pump reductant from the reductant tank 350 through the outlet of the pump 310 to the doser 330 via an outlet line 312 and back to the reductant tank 350 via a return line 314.

The switch control 416 may be used to control whether the pressure control system 410 or the flow or frequency control system 510 outputs the command to the pump 310. If the doser 330 is dosing reductant, the controller 320 may set a flag value or parameter value to 1 to indicate dosing is occurring and the flow or frequency control system 510 is active to output the pump command value. If the doser 330 is not dosing reductant, then the controller 320 may set a flag value or parameter value to 0 to indicate dosing is not occurring and the pressure control system 410 is active to output the pump command value.

The measured pump pressure 418 is measured by a pressure sensor downstream of the pump 310 and outputs and/or includes an accessible data value indicative of a measured pump outlet pressure 418 for the feedback control 414 and/or reference generator 412.

Figure 5:
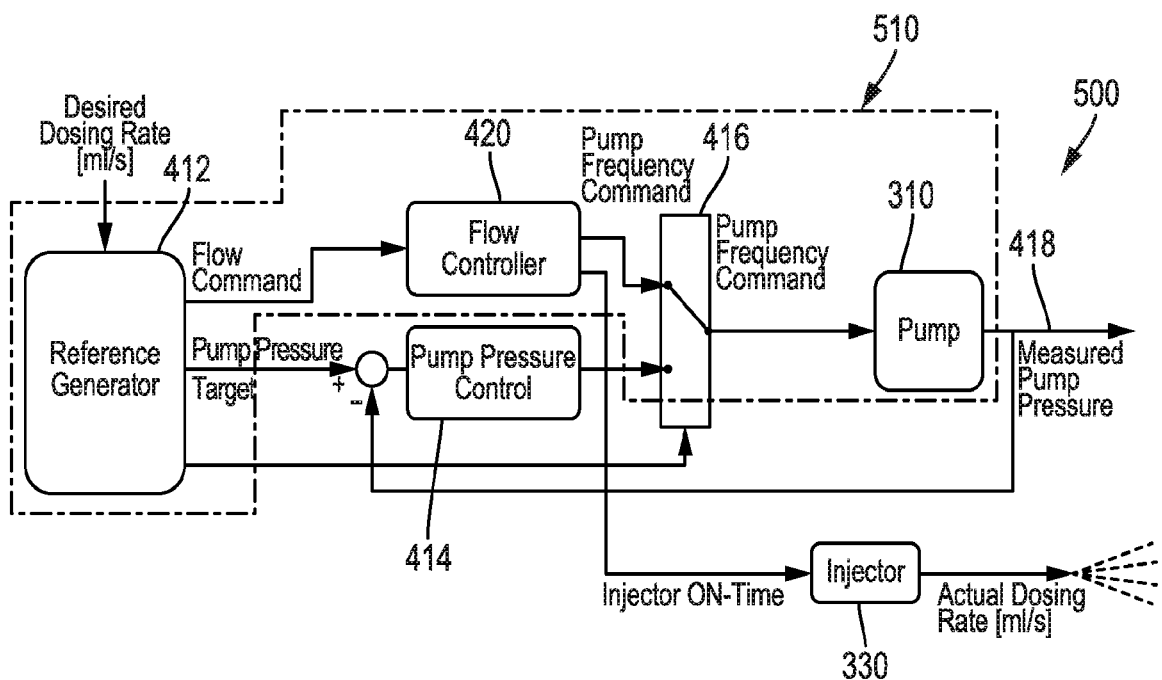
FIG. 5 is the process diagram of FIG. 4 depicting the switched pressure/flow control system implemented by the controller of FIG. 3 and showing in detail the components of the flow or frequency control system.

FIG. 5 depicts a control process diagram 500 with the components of the flow or frequency control system 510 outlined in the dot and dashed lines. In the implementation shown, the flow control system 510 includes the reference generator 414, the flow controller 420, the switch control 416, the fixed displacement pump 310, and the measured pump pressure 418. The flow or frequency control system 510 can be implemented by the controller 320 when the switched pressure/flow control system 300 is dosing reductant using the doser 330. As shown in the control diagram 500, a flow command is output from the reference generator 412 to the flow controlled pump via the switch control 416. The pump frequency command can be determined based on the pump frequency determined using the linear relationship between the fixed displacement pump flow rate for a given pump outlet pressure as described in reference to FIG. 2.

The reference generator 414 determines the desired pump frequency command based on a reductant temperature, a battery voltage, a desired dosing rate, a measured pump outlet pressure 418, an exhaust flow rate, and/or an exhaust temperature that are received and/or accessed by the controller 320. For instance, a lookup table or derived equation may be used to determine or calculate a desired pump outlet flow rate based on the reductant temperature, desired dosing rate, measured pump outlet pressure 418, exhaust flow rate, and/or exhaust temperature. The desired pump outlet flow rate may then be used to determine the frequency at which the pump 310 needs to be operated to achieve the desired pump outlet flow rate for a given pump outlet or resistive pressure.

The pump frequency command is output to through the switch control 416 to the fixed displacement pump 310. As discussed above, the switch control 416 may be used to control whether the pressure control system 410 or the flow or frequency control system 510 outputs the command to the pump 310. If the doser 330 is dosing reductant, the controller 320 may set a flag value or parameter value to 1 to indicate dosing is occurring and the flow or frequency control system 510 is active to output the pump command value. If the doser 330 is not dosing reductant, then the controller 320 may set a flag value or parameter value to 0 to indicate dosing is not occurring and the pressure control system 410 is active to output the pump command value.

The measured pump pressure 418 is measured by a pressure sensor downstream of the pump 310 and outputs and/or includes an accessible data value indicative of a measured pump outlet pressure 418 for the reference generator 412.

In some implementations, an actual dosing rate may be used by the controller 320 to modify the desired dosing rate. In some further implementations, a doser on-time may be used to determine whether the switched pressure/flow control system 300 is operating as a pressure control system 410 or as a flow or frequency control system 510.

Figure 6:
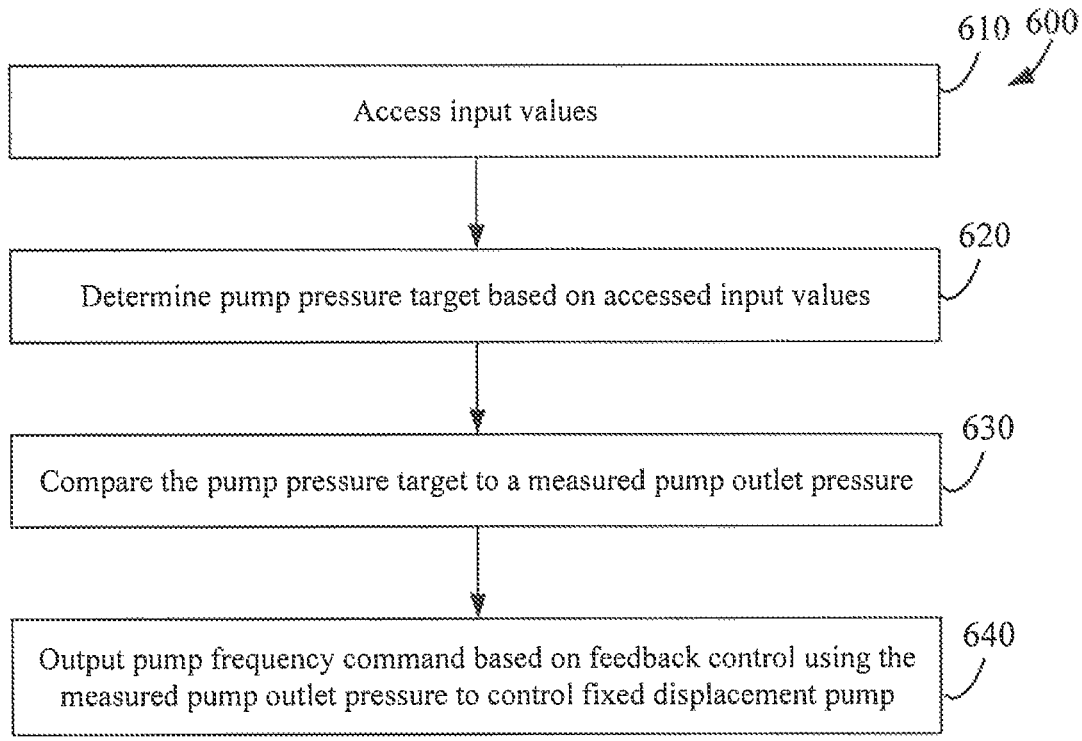
FIG. 6 is a flow diagram depicting control of the switched pressure/flow control system of FIG. 3 using the pressure control system when not dosing.
Figure 7:
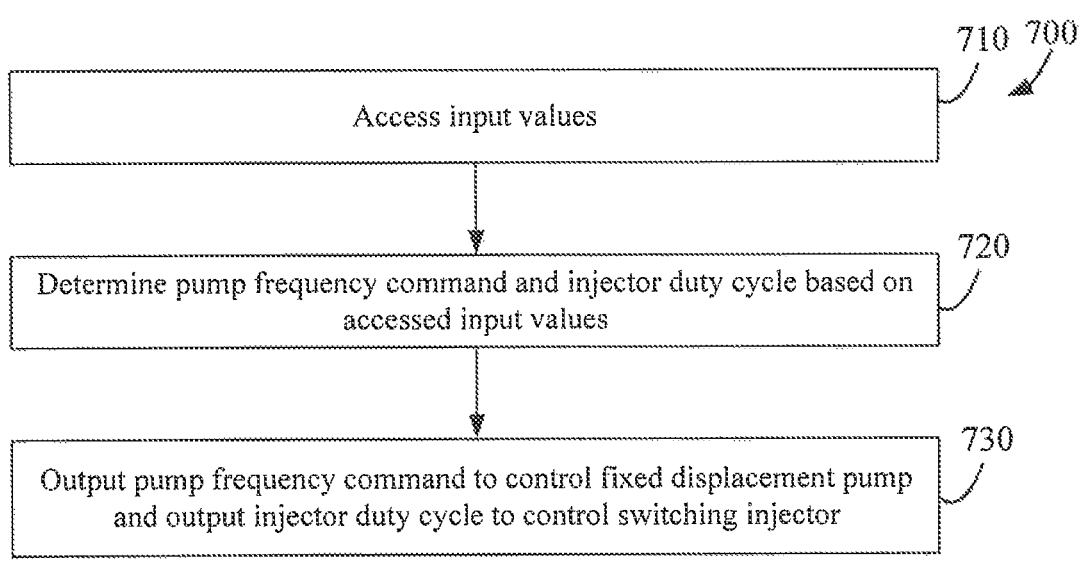
FIG. 7 is a flow diagram depicting control of the switched pressure/flow control system of FIG. 3 using the flow or frequency control system when dosing.
Figure 8:
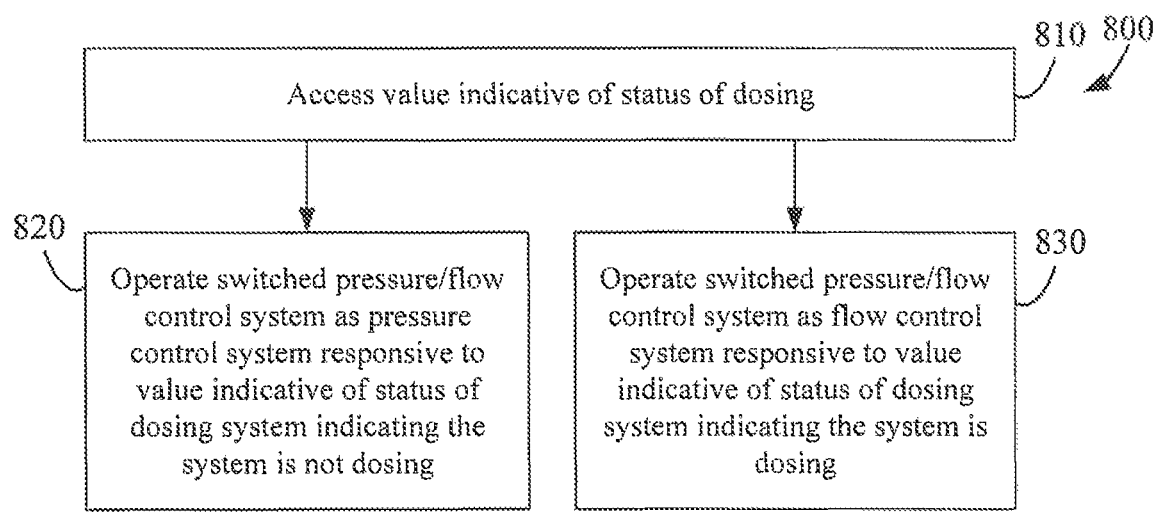
FIG. 8 is a flow diagram for a switching process for a controller for a switched pressure/flow control system.

FIG. 6 depicts an implementation of a process 600 for the controller 320 of the switched pressure/flow control system 300 to operate the system 300 as a pressure control system 410. FIG. 7 depicts an implementation of a process 700 for the controller 320 of the switched pressure/flow control system 300 to operate the system 300 as a flow or frequency control system 510. FIG. 8 depicts an implementation of a process 800 for the controller 320 to operate the switched pressure/flow control system 300 as a pressure control system 410 or flow control system 510 responsive to an accessed value indicative of the status of dosing.

The process of FIG. 6 includes accessing the input values 610. The input values may be accessed and/or received by a controller 320. The input values may include a reductant temperature, a desired dosing rate, a measured pump outlet pressure 418, an exhaust flow rate, and/or an exhaust temperature. The process 600 includes determining a pump pressure target based on the accessed input values 620. For instance, a desired pump pressure target may be based on a reductant temperature and a measured pump outlet pressure 418 that are received and/or accessed by the controller 320. A lookup table may include experimentally acquired and/or calculated data for pump outlet pressures for corresponding reductant temperatures to maintain reductant flow through the system 300 to reduce freezing and/or overheating of components due to ambient temperature conditions. In other implementations, the desired pump pressure target may be calculated based on reductant temperatures using derived equations.

The process 600 may include comparing the pump pressure command to a measured pump outlet pressure 630 and using feedback control to generate a pump frequency command based on the measured pump outlet pressure 418 to be output 640 for controlling the fixed displacement pump 310. The feedback control 414 may be a PID (proportional-integral-derivative) feedback control. The pump frequency command is output to the fixed displacement pump 310 responsive to the system operating as a pressure control system 410. The pump frequency command is output and/or used to control pumping of reductant from the reductant tank 350 through the outlet of the pump 310 to the doser 330 via an outlet line 312 and back to the reductant tank 350 via a return line 314.

The process 700 of FIG. 7 includes accessing the input values 710. The input values may be accessed and/or received by a controller 320. The input values may include a reductant temperature, a desired dosing rate, a measured pump outlet pressure 418, an exhaust flow rate, and/or an exhaust temperature. The process also includes determining a pump frequency command based on the accessed input values 720. For instance, a lookup table or derived equation may be used to determine or calculate a desired pump outlet flow rate based on the reductant temperature, desired dosing rate, measured pump outlet pressure 418, exhaust flow rate, and/or exhaust temperature. The desired pump outlet flow rate may then be used to determine the frequency at which the pump 310 needs to be operated to achieve the desired pump outlet flow rate for a given pump outlet or resistive pressure.

The pump frequency command is output 730 to the fixed displacement pump 310 responsive to the system operating as a flow control system 510. The pump frequency command is output and/or used to control pumping of reductant from the reductant tank 350 through the outlet of the pump 310 to the doser 330 via an outlet line 312 for accurate control of dosing using the known flow rates for the fixed displacement pump 310.

FIG. 8 provides a process 800 for the controller 320 to operate the switched pressure/flow control system 300 as a pressure control system 410 or flow control system 510 responsive to an accessed value indicative of the status of dosing. The process 800 includes accessing a value indicative of a status of dosing 810. The value can be a flag, a parameter, or any other machine-readable indicator that indicates whether the switched pressure/flow control system 300 is dosing reductant through the doser 330. If the doser 330 is dosing reductant, as indicated by the value indicative of a status of dosing 810, then the process 800 can operate the switched pressure/flow control system 300 as the flow or frequency control system 510 and utilize the process 700. If the doser 330 is not dosing reductant, as indicated by the value indicative of a status of dosing 810, then the process 800 can operate the switched pressure/flow control system 300 as pressure control system 410 and utilize the process 600.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A reductant dosing system comprising:
   a doser;
   a fixed displacement pump in fluid communication with the doser;
   a reductant source in fluid communication with the fixed displacement pump; and
   a controller communicatively coupled to the fixed displacement pump to control operation of the fixed displacement pump, wherein the controller is programmed to operate the fixed displacement pump to switch between (i) a pressure control system, used when the doser is not dosing reductant, and (ii) a flow control system, used when the doser is dosing the reductant, wherein the pressure control system is programmed to determine a pump pressure target based on one or more first input values, measure a pump outlet pressure, and determine a first pump frequency command value to be output to control the fixed displacement pump based upon the pump pressure target and the pump outlet pressure that is measured; and wherein the flow control system is programmed to determine a desired pump outlet flow target based upon one or more second input values and determine a second pump frequency command to be output to control the fixed displacement pump to achieve the desired pump outlet flow target and a doser duty cycle.

2. The reductant dosing system of claim 1, wherein the one or more first input values or the one or more second input values comprise one or more of a reductant temperature, a desired dosing rate, a measured pump outlet pressure, an exhaust flow rate, or an exhaust temperature.

3. The reductant dosing system of claim 1, wherein the pressure control system is programmed to determine the pump pressure target based on a reductant temperature and the pump outlet pressure that is measured.

4. The reductant dosing system of claim 1, wherein the pressure control system is programmed to determine the pump pressure target using a lookup table.

5. The reductant dosing system of claim 1, wherein the pressure control system is programmed to calculate the pump pressure target based on a reductant temperature.

6. The reductant dosing system of claim 1, wherein the flow control system is programmed to determine the second pump frequency command based on the pump outlet pressure that is measured.

7. The reductant dosing system of claim 1, wherein the flow control system is programmed to determine the second pump frequency command using a lookup table.

8. The reductant dosing system of claim 1, wherein the flow control system is programmed to calculate the second pump frequency command based on a reductant temperature.

9. A process comprising:
accessing a value indicative of dosing status;
accessing, in response to determining from the value that a doser is not dosing reductant, at least a reductant temperature and a measured pump outlet pressure;
determining a pump pressure target for a fixed displacement pump based on the accessed reductant temperature and measured pump outlet pressure;
comparing the pump pressure target to the measured pump outlet pressure; and
outputting a pump frequency command to the fixed displacement pump to control pumping of the reductant from a reductant tank through an outlet of the fixed displacement pump to the doser via an outlet line and back to the reductant tank via a return line based upon the comparison between the pump pressure target and the measured pump outlet pressure.

10. The process of claim 9, wherein the pump pressure target is selected from a lookup table.

11. The process of claim 9, wherein, in the step of determining the pump pressure target, the pump pressure target is determined further based on at least one of a desired dosing rate, an exhaust flow rate, or an exhaust temperature.

12. A process comprising:
accessing a value indicative of dosing status;
accessing, in response to determining from the value that a doser is dosing reductant, one or more input values for one or more of a reductant temperature, a desired dosing rate, a measured pump outlet pressure, an exhaust flow rate, or an exhaust temperature;
determining a desired pump outlet flow target based upon the one or more input values;
determining a pump frequency command based on the desired pump outlet flow target; and
outputting the pump frequency command to a fixed displacement pump to control pumping of the reductant from a reductant tank through an outlet of the fixed displacement pump to the doser via an outlet line for dosing.

13. The process of claim 12, wherein determining the pump frequency command is based on the measured pump outlet pressure.

14. The process of claim 12, wherein the pump frequency command is selected from a lookup table.

15. The process of claim 12, wherein the pump frequency command is calculated based on the reductant temperature.

16. The process of claim 12 further comprising:
determining, from the value that the doser is not dosing the reductant;
determining, in response to the determining that the doser is not dosing the reductant, a pump pressure target for the fixed displacement pump based on the accessed one or more input values;
comparing the pump pressure target to the measured pump outlet pressure; and
outputting a second pump frequency command to the fixed displacement pump to control pumping of the reductant from the reductant tank through the outlet of the fixed displacement pump to the doser via the outlet line and back to the reductant tank via a return line based upon the comparison between the pump pressure target and the measured pump outlet pressure.

* * * * *